United States Patent
Deschenes et al.

(10) Patent No.: US 11,317,058 B2
(45) Date of Patent: Apr. 26, 2022

(54) SYSTEM AND METHOD OF WIRELESS COMMUNICATION USING A DYNAMIC MULTICAST DISTRIBUTION SCHEME

(71) Applicant: David Clark Company Incorporated, Worcester, MA (US)

(72) Inventors: Brad Deschenes, Dudley, MA (US); Sanjay Gupta, Bedford, MA (US); Nicholas Cannata, Sutton, MA (US)

(73) Assignee: David Clark Company Incorporated, Worcester, MA (US)

( * ) Notice: Subject to any disclaimer, the term of this patent is extended or adjusted under 35 U.S.C. 154(b) by 94 days.

(21) Appl. No.: 16/823,863

(22) Filed: Mar. 19, 2020

(65) Prior Publication Data
US 2020/0314027 A1    Oct. 1, 2020

Related U.S. Application Data

(60) Provisional application No. 62/879,693, filed on Jul. 29, 2019, provisional application No. 62/858,411, (Continued)

(51) Int. Cl.
*H04L 12/931* (2013.01)
*H04N 7/15* (2006.01)
(Continued)

(52) U.S. Cl.
CPC ......... *H04N 7/15* (2013.01); *G11B 20/10527* (2013.01); *G11B 27/005* (2013.01);
(Continued)

(58) Field of Classification Search
CPC . H04B 17/318; H04L 1/0018; H04L 12/1845; H04L 49/201; H04L 45/16; H04W 4/06
See application file for complete search history.

(56) References Cited

U.S. PATENT DOCUMENTS

| 6,212,206 B1 | 4/2001 | Ketcham |
| 6,651,751 B2 | 11/2003 | Kluczynski |

(Continued)

FOREIGN PATENT DOCUMENTS

| GB | 2480821 A | 12/2011 |
| WO | 2015105970 A1 | 7/2015 |

OTHER PUBLICATIONS

ISR and Written Opinion in corresponding PCT application No. PCT/US2020/024389 dated Jun. 12, 2020.

*Primary Examiner* — Fahmida S Chowdhury
(74) *Attorney, Agent, or Firm* — Burns & Levinson, LLP; Steven M. Mills

(57) ABSTRACT

A system and method of wireless communication includes a host application running on a server. A plurality of communication devices are in communication with the host application and configured to send and receive data packets between others of the communication devices via the host application. The data packets containing digital information related to at least one type of media content. The host application receives the data packets and distributes the data packets according to a dynamic multicast distribution scheme. The dynamic multicast distribution scheme changes, for each communication device, according to at least one communication metric through WiFi modulation, forward error correction, or audio codec sampling and bit rates.

26 Claims, 4 Drawing Sheets

US 11,317,058 B2
Page 2

Related U.S. Application Data filed on Jun. 7, 2019, provisional application No. 62/825,265, filed on Mar. 28, 2019.

(51) Int. Cl.
*G11B 20/10* (2006.01)
*G11B 27/00* (2006.01)
*H04B 17/318* (2015.01)
*H04L 1/00* (2006.01)
*H04L 12/18* (2006.01)
*H04L 49/201* (2022.01)
*H04L 47/62* (2022.01)
*H04L 49/90* (2022.01)

(52) U.S. Cl.
CPC ......... *H04B 17/318* (2015.01); *H04L 1/0003* (2013.01); *H04L 1/0009* (2013.01); *H04L 1/0018* (2013.01); *H04L 1/0057* (2013.01); *H04L 12/1845* (2013.01); *H04L 47/621* (2013.01); *H04L 49/201* (2013.01); *H04L 49/90* (2013.01)

(56) References Cited

U.S. PATENT DOCUMENTS

| | | | |
|---|---|---|---|
| 9,768,917 | B2 | 9/2017 | Taniguchi |
| 10,318,420 | B2 | 6/2019 | Muralimanohar |
| 2003/0152093 | A1 | 8/2003 | Gupta et al. |
| 2004/0218626 | A1 | 11/2004 | Tyldesley et al. |
| 2005/0021593 | A1 | 1/2005 | Fitzgerald |
| 2010/0050181 | A1 | 2/2010 | Zhang |
| 2012/0155431 | A1 | 6/2012 | Kang |
| 2013/0208593 | A1 | 8/2013 | Nandagopal |
| 2017/0187641 | A1 | 6/2017 | Lindqvist |
| 2017/0332209 | A1* | 11/2017 | Awai ............ H04N 21/43615 |
| 2018/0102965 | A1* | 4/2018 | Hari .................. H04L 45/74 |
| 2021/0111841 | A1 | 4/2021 | Ohta |
| 2021/0378053 | A1* | 12/2021 | Saily ................. H04W 4/06 |

* cited by examiner

SYSTEM AND METHOD OF WIRELESS COMMUNICATION USING A DYNAMIC MULTICAST DISTRIBUTION SCHEME

CROSS REFERENCE TO RELATED APPLICATIONS

This application claims priority to and the benefit of U.S. Provisional Patent Application No. 62/825,265, filed on Mar. 28, 2019, and titled "SYSTEM AND METHOD OF WIRELESS COMMUNICATION USING A DYNAMIC MULTICAST DISTRIBUTION SCHEME", the contents of which are incorporated herein by reference as though fully set forth herein. Further, this application claims priority to and the benefit of U.S. Provisional Patent Application No. 62/858,411, filed on Jun. 7, 2019 and titled "SYSTEM AND METHOD OF WIRELESS COMMUNICATION USING DESTINATION BASED QUEUEING", the contents of which are incorporated herein by reference as though fully set forth herein. Further, this application claims priority to and the benefit of U.S. Provisional Patent Application No. 62/879,693, filed on Jul. 29, 2019 and titled "METHOD AND SYSTEM OF DYNAMIC PLAYBACK VARIATION FOR MULTIMEDIA COMMUNICATION", the contents of which are incorporated herein by reference as though fully set forth herein.

FIELD OF THE TECHNOLOGY

The subject disclosure relates to wireless communication and more particularly to a host facilitating communication between numerous communication devices.

BACKGROUND OF THE TECHNOLOGY

Several methods exist today for facilitating wireless communication between a group of devices. One traditional approach is to use a push-to-talk (PTT) system. Similar to physical two-way radios, users push a button to talk, and any user in that destination group can hear that user. These systems suffer from the drawback that only one user may talk at a time, and therefore are considered half-duplex, or simplex.

Another common approach relies on voice over IP (VoIP). Using this architecture, multiple users can connect together and transmit and receive audio in a real-time, full-duplex environment using local or wide area networks. These systems may integrate with various devices, including with landlines and cellular, to allow versatility in ways to connect to the call session. Similarly, multimedia conferencing systems are built on the architecture of VoIP and allow users to join meetings worldwide using electronic conference software. These systems are real-time and full-duplex, and additionally allow for live video and data for multi-user collaboration. However, the real-time, full-duplex nature of systems using VoIP can result in poor performance for the system as a whole.

Devices can also communicate via streaming systems. These systems are non-real-time systems where one source, or user, transmits restored (or real time) content to multiple destinations (users). These systems employ a large buffer times of at least several seconds to smooth out playback at the destinations and provide a good user experience. As a result of this delay, these systems do not truly transmit data in real time. Additionally, communication between the destinations is not part of the system.

The systems described above have to sacrifice features to meet the optimal system metrics or compromise system performance to have more features. An example of this can be seen by comparing the VoIP implementations to the simplex PTT implementation. VoIP allows for real-time, full-duplex communication but the full-duplex nature of the conversation is susceptible to mediocre system metrics. Meanwhile a simplex system can suffer from latency as the PTT feature assists and dictates as to when users can speak and when they must only listen.

SUMMARY OF THE TECHNOLOGY

In light of the needs described above, in at least one aspect, there is a need for a communication system which optimizes performance without sacrificing important system capabilities.

In at least one aspect, the subject technology relates to a wireless communication system. The system has a host application running on a server. The system also includes a plurality of communication devices configured to act as destination entities and receive a plurality of data packets containing digital information related to at least one type of media content. At least one communication device is further configured to act as a source entity and send the data packets. The system includes an access point in communication with the host application and in wireless communication with the communication devices. The access point is configured to receive the data packets from the communication device configured to act as the source entity and distribute the data packets to the communication devices according to a dynamic multicast distribution scheme. The dynamic multicast distribution scheme changes according to at least one communication metric through WiFi modulation, forward error correction, or audio codec sampling and bit rates.

In some embodiments, the communication metrics include jitter, an estimate of latency, packet loss, and received signal strength indicator (RSSI). In some cases, the communication metrics include an estimate of latency and the dynamic multicast distribution scheme changes when the estimate of latency exceeds a predetermined threshold. The communication metrics can include jitter and the dynamic multicast distribution scheme can change when jitter exceeds a predetermined threshold. The communication metrics can include received signal strength indicator (RSSI), and the wireless communication system can be further configured such that when RSSI for one of the communication devices exceeds a predetermined threshold, the dynamic multicast distribution scheme changes, for said communication device, to utilize a new WiFi standard. In some cases, the communication metrics include RSSI and the wireless communication system is further configured such that when RSSI for one of the communication devices exceeds a predetermined threshold, the dynamic multicast distribution scheme changes, for said communication device, to utilize one of the following: a new modulation rate; or a new broadcast frequency. In some cases, the communication metrics further include bit error rate. The dynamic multicast distribution scheme can then change when bit error rate exceeds a predetermined threshold. In some cases, the communication metrics include RSSI and the dynamic multicast distribution scheme changes based on RSSI such that when RSSI device for a communication device decreases below a predetermined lower threshold, the access point decreases a multicast rate to said device. The dynamic multicast distribution scheme can further change such that the multicast rate to said device increases when RSSI exceeds a predetermined upper threshold. Further, when RSSI for a communication device decreases below a minimum threshold, the access point can change the multicast rate for said device to a minimum rate.

In some embodiments, the dynamic multicast distribution scheme changes according to at least one communication metric through WiFi modulation. WiFi modulation can include changing frequency of operation and transmission rates to transport the data packets to communication devices which are a further distance from the access point. In some cases, the dynamic multicast distribution scheme changes according to at least one communication metric through forward error correction. Forward error correction can include sending at least one data packet multiple times, and/or sending at least one data packet containing a previous, current, and next data packet in a payload.

In some embodiments, the dynamic multicast distribution scheme changes according to at least one communication metric through forward error correction and changing audio codec sampling and bit rates. Changing audio codec sampling and bit rates can include transporting the data packets using a lower bandwidth codec while forward error correction is implemented. In some cases, the dynamic multicast distribution scheme changes according to at least one communication metric through WiFi modulation and changing audio codec sampling and bit rates. Changing audio codec sampling and bit rates can include transporting the data packets using a lower bitrate codec while a lower bandwidth WiFi modulation standard is implemented.

In some embodiments the system is configured to allow the communication devices to dynamically connect to the host application via the access point such that the communications devices can connect to, or disconnect from, the host application during a communication session. In some cases, the host application is configured to allow a plurality of communication devices to dynamically connect to, or disconnect from, the host application via the access point during a communication session. The host application can then selectively disconnect communication devices from a communication session based on the communication metrics. Additionally the host application can then control the transfer of the data packets between the access point and the communication devices.

In some embodiments, the data packets are transported using User Datagram Protocol. In some cases, the host application is configured to identify data packets as bearer traffic or control traffic, the bearer traffic related to media content and the control traffic related to system status or client status. The host application can then transport the bearer traffic using multicast and User Datagram Protocol and transport the control traffic using unicast and Transmission Control Protocol.

In some embodiments, at least one of the communication devices is configured to periodically send client status data packets to the host application at a set time interval. The host application is then configured to take action based on whether an expected client status data packet is received and information contained in the client status data packets. In some cases, the dynamic multicast distribution scheme includes a minimum allowable WiFi beacon interval of 100 milliseconds and a DTIM interval of 1. The wireless communication system can then discard multicast frames when a delay for said frames exceeds a threshold.

In some embodiments, the access point is further configured to identify whether real-time multimedia sessions are in progress and increase a DTIM interval when no real-time multimedia sessions are in progress. The communication metrics can include jitter and delay, and the dynamic multicast distribution scheme can change the DTIM interval based on the jitter and delay.

In some embodiments, the access point is further configured to selectively change between the dynamic multicast distribution scheme and a unicast distribution scheme. The unicast distribution scheme can be used when the total data packets transmitted over the wireless communication system over a set time period is below a set total. The dynamic multicast distribution scheme can be used when the total data packets transmitted over the wireless communication over the set time period is above the set total.

In some embodiments, the at least one communication metric includes delay. The access point then selectively changes between the dynamic multicast distribution scheme and the unicast distribution scheme according to the delay. In some cases, the dynamic multicast distribution scheme includes a WiFi beacon interval. The dynamic multicast distribution scheme can then include a maximum percentage of non-unicast traffic permitted per WiFi beacon interval. The maximum percentage of non-unicast traffic permitted per WiFi beacon interval can decrease as total traffic of the wireless communication system increases.

In some embodiments, the dynamic multicast distribution scheme changes based on a total number of communication devices transmitting data packets over the system and total traffic of the system. In some cases, when the total traffic of the system exceeds a given threshold, a multicast rate of the dynamic multicast distribution scheme increases and communication devices with a received signal strength indicator below a set threshold are disconnected.

In some embodiments, the wireless communication system is further configured to set a location for multimedia mixing based on a total number of communication devices in a communication session. When the total number is below a predetermined threshold, multimedia mixing can be carried out at each communication device. When the total number is above the predetermined threshold, multimedia mixing can be carried out on the server.

In at least one aspect, the subject technology relates to a wireless communication system. A host application runs on a server in communication with a first access point and a second access point. A first plurality of communication devices are configured to dynamically connect to the host application via wireless communication with the first access point such that the first plurality of communications devices can connect to, or disconnect from, the host application during a communication session. A second plurality of communication devices are configured to dynamically connect to the host application via wireless communication with the second access point such that the second plurality of communications devices can connect to, or disconnect from, the host application during the communication session. The host application receives data packets containing digital information related to at least one type of media content from at least one of the first or second plurality of communication devices, the data packets being distributed to the others of the communication devices according to a dynamic multicast distribution scheme. The dynamic multicast distribution scheme changes according to at least one communication metric of the system through WiFi modulation, forward error correction, or audio codec sampling and bit rates.

In at least one aspect, the subject technology relates to a wireless communication system. A host application runs on a server. A plurality of communication devices are configured to send and receive a plurality of data packets containing digital information related to at least one type of media content. An access point is in communication with the host application and in wireless communication with the communication devices. The access point is configured to receive the data packets from one communication device and distribute the data packets to the communication devices according to a distribution scheme. The wireless communication system is configured to switch the distribution scheme between a unicast distribution scheme and a multicast distribution scheme based on system performance metrics, the system performance metrics including a number of communication devices in a communication session and a system load. The multicast distribution scheme includes performance parameters including modulation rates, audio codec sampling and bit rates, and forward error correction, the performance parameters being changed according to performance metrics including received signal strength indicator, bit error rate, and jitter. The wireless communication system is further configured to set a location for multimedia mixing on either the server or the communication devices based on the system performance metrics.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
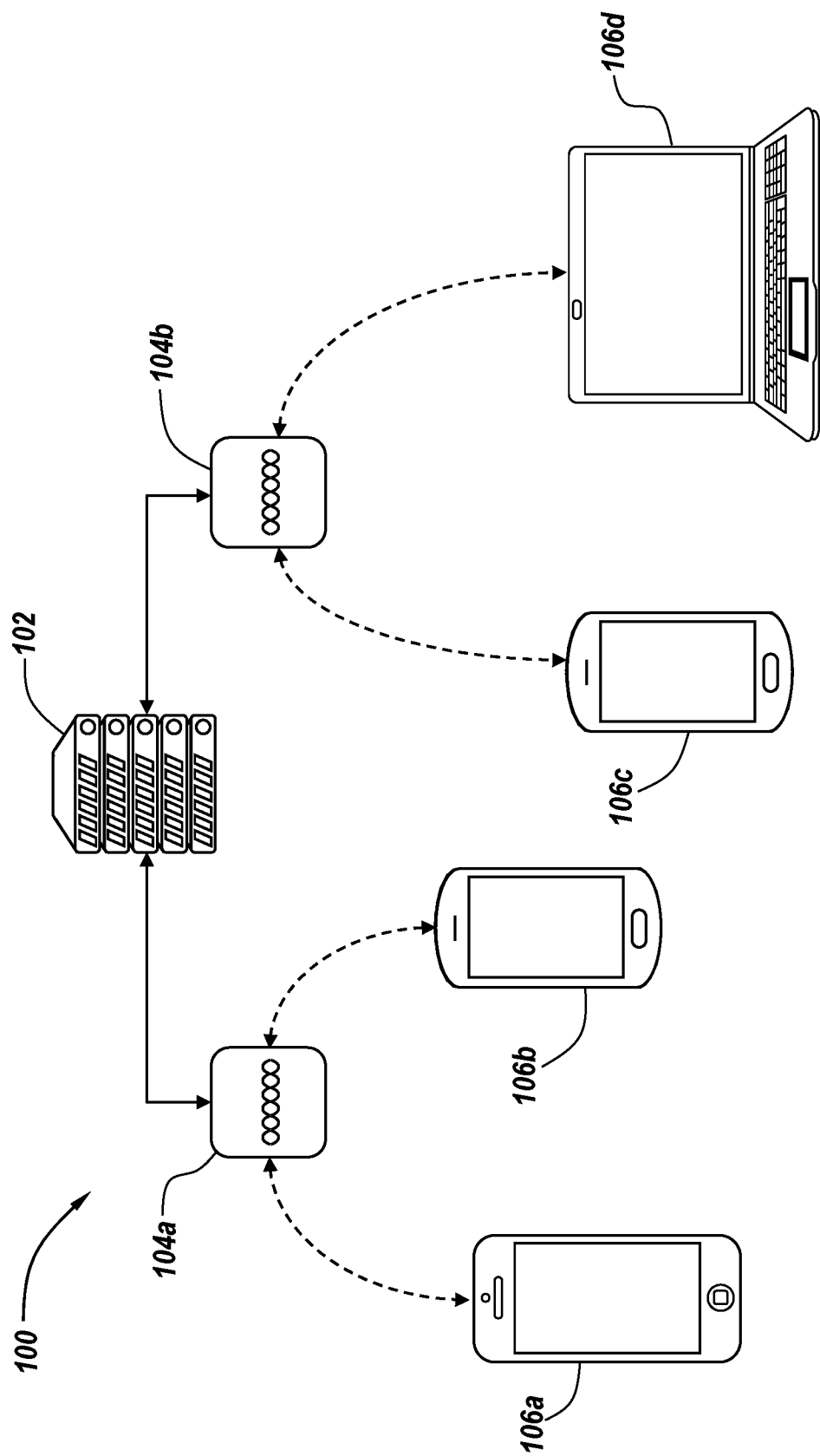
FIG. 1 is a schematic diagram of a system in accordance with the subject technology.

The subject technology overcomes many of the prior art problems associated with multi-device, real time, multimedia IP systems. In brief summary, the subject technology provides a system and method for controlling wireless communication that dynamically changes a data distribution scheme to optimize performance. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

In general, both wired and wireless devices described herein are engineered to withstand rugged environments while still being user friendly. The high cost of rugged products can be a barrier of entry in certain markets. As such, the systems herein utilize the built in wireless capabilities of smart devices, as well as their ubiquitous nature and broad availability in today's society, in order to decrease the cost of entry for users of the system.

Referring now to FIG. 1, a schematic diagram of a system 100 in accordance with the subject technology is shown. The system 100 includes a host 102, which is a server running a host application to allow wireless real-time, full duplex, multi-party, multimedia communication between communication devices. The server can be physical hardware or software based. The server manages all communication device 106a-106d (generally 106) connections and may also provide multimedia mixing.

Two access points 104a, 104b (generally 104) facilitate communication between the server 102 and four communication devices 106 for carrying out a communication session. The access points 104 are networking devices which connect the communication devices 106 to the host 102 server during a communication session. The access points 104 transmit and receive data to and from the communication devices 106 using the WiFi 802.11 standards, and route traffic as needed utilizing specified transportation methods including IP multicast and unicast.

The communication devices 104 can be any device used for communication, such as a smartphone (e.g. 106a-106c) or laptop (e.g. 106d). For example, a typical communication device 106 can be a smartphone running an iOS or Android operating system. The communication devices 106 run software which allows the communication devices 106 to connect to the system 100, provides a user interface, and allows for the transmission and receipt of multimedia data. The communication devices 106 can leave or join a given communication session on the system 100 per user demand. The number of access points 104 and communication devices 106 shown is exemplary only and it should be understood that the system 100 only requires at least one access point 104 and at least two communication devices 106 to operate.

During a given communication session, data packets containing at least one type of media content are transmitted between the devices 106. For example, the data packets can include data related to audio and/or video. At least one communication device 106 is configured to act as a source entity and send data packets. All of the communication devices 106 on the system are configured to act as destination entities and receive the data packets sent from the source entity. While the system 100 only requires one source entity, in some cases, many, or all of the communication devices 106 can be configured to act as both destination and source entities, allowing duplex communication between all of the devices 106. As an example, the communication devices 106 could include several cell phones and laptops, all of which are capable of sending and receiving audio and video between one another over the system 100. All communication devices 106 are linked up to the system 100 through a wireless link to an access point 104.

Communication metrics of the system 100 are monitored throughout a communication session. Metrics such as latency, jitter, packet loss, received signal strength indicator (RSSI), and other indicators of system performance are tracked during the communication session. The access points 104 control distribution of the data packets across the communication devices 106. The data packets are distributed by the access points 104, and data packets related to multimedia data are distributed based on a dynamic multicast distribution scheme, unless unicast is being used as discussed in more detail below. Based on the system performance, the distribution scheme changes how packets are being distributed to one or more of the communication devices 106. For example, when predetermined thresholds and/or ranges of performance metrics are identified, the distribution scheme can change how the data packets are being distributed through numerous techniques, including WiFi modulation, WiFi Beacon Interval, WiFi DTIM interval, multicast rate, maximum percentage of non-unicast traffic permitted per beacon period, forward error correction, and audio codec sampling and bit rates. This increases clarity and reliability for one or more users (i.e. one or more communication devices 106), and generally improves system performance. Other changes can also be made to the system 100 based on the communication metrics. For example, the host application can be configured to selectively disconnect a communication device 106 from a communication session based on the communication metrics related to that device 106 (e.g. such that communication device 106 is disconnected if it has a poor connection).

The system 100 also includes other equipment, not distinctly shown in FIG. 1, to enable communication between the devices 106. For example, the system 100 can include routers to allow the communication devices 106 to wirelessly connect to the host 102 via the access points 104. Data is thereby transmitted wirelessly between the access points 104 and the devices 106. The host 102 server is normally connected to the access points 104 by a physical wire. Therefore the router can translate data packets from the wired protocols to wireless, and vice versa.

The system 100 can also include a switch or a hub. If it is desirable to connect the host 102 server to existing network infrastructure, a switch allows for multiple wired connections between the host 102 and the rest of the existing infrastructure. Additionally, or alternatively, the system 100 can be connected to other systems 100, or other associated devices and systems, such as radio network layers for 2-way radio, intercom systems, and/or cellular systems.

A Dynamic Host Configuration Protocol (DHCP) server may be used to assign IP addresses to the host 102 server and connected wireless devices 106. The 802.11 WiFi standard is utilized for all wireless transmission of data, including multimedia, between the host 102 and communication devices 106. This standard is used as many existing smart devices already comply with the standard, allowing easy deployment of the system 100 as well as the ability to use off-the-shelf hardware to expand coverage of the system 100 based off of a custom application (e.g. a particular user's application). In the example of FIG. 1, the host 102 is part of a local infrastructure which the communication devices 106 connect to through access points 104. However, in other arrangements, the host 102 will contain a WiFi access point 104. In that case, utilization of the access point 104 is optional if a WiFi infrastructure is already present, where a completely local and dedicated intercom system is desired. Notably, the physical implementation of the system 100 has many permutations. For example, the access point 104, server software, DHCP server, router, and switch could all be one piece of hardware with all the necessary software running on it, all discrete devices, or any blend between these two extremes.

Figure 2:
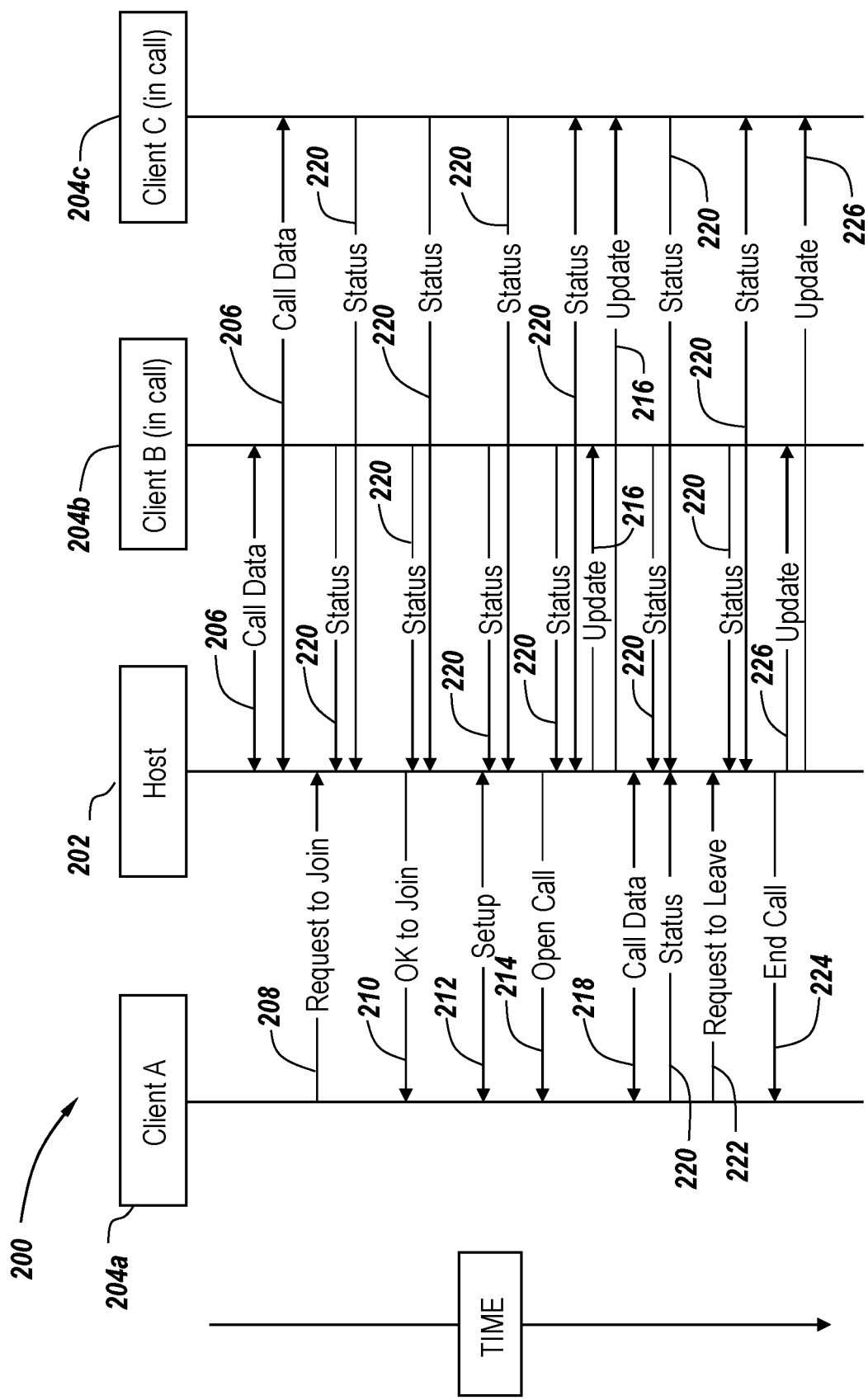
FIG. 2 is a diagram of an exemplary communication session taking place on the system in accordance with the subject technology.

Referring now to FIG. 2, an exemplary communication session is shown generally at 200. The session includes a host 202, which is in wireless communication with entities or clients 204a-204c (generally 204) which are communicating. Note that the terms entities and clients are used interchangeably with communication devices. Actions taking place during the communication session over time are represented linearly, with actions closer to the beginning of the communication session represented by the higher up lines with respect to FIG. 2. It should be understood that all times shown for actions are rough and exemplary only.

At the start of the portion of the session shown, clients 204b and 204c are already part of the communication session and communicating via the host 202. As the clients 204b and 204c communicate, data packets, including any media content being transmitted between the clients 204b, 204c, are sent to the host 202. The host 202 optionally mixes the data for the clients 204b, 204c which are part of the communication session and sends out a (generally multicast) stream to clients 204b, 204c that have joined the session. To that end, clients 204b and 204c are exchanging call data 206 with the host 202. For ease of illustration, this is shown at slightly different times, but it should be understood both clients 204b, 204c will continue to transmit call data, after joining, over the course of the communication session unless they leave.

Initially, client 204a has not joined the session and is not communicating with the other clients 204b, 204c. New clients that are wirelessly connected to the system, such as client 204a may also join a communication session at any time. Clients that are part of a call session, such as clients 204b and 204c, may also leave at any time. Clients joining or leaving a call session does not disrupt the system.

Client 204a eventually requests to join the communication session at line 208. Client 204a receives confirmation that it is cleared to join the session at line 210. Line 212 represents setup data being exchanged between the host 202 and the client 204a, and then a call is opened with client 204a (line 214) which becomes a part of the communication session. The host 202 handles all of the initial back and forth relating to call setup. RTP and RTCP protocols can be used at the Application layer (i.e. of the OSI network) to manage the session and the data transmitted over the system. Clients 204b and 204c are then updated, at line 216, to reflect that client 204a is part of the communication session. Client 204a can then send and receive data packets over the system during the communication session (line 218).

Periodically, status packets are also transmitted between the clients 204 within the communication session and the host 202 (represented by lines 220). The status packets can include control traffic relating to communication metrics of the system (e.g. control information) and can be relied upon to measure system performance. An exemplary status packet can include, for example, a packet ID number, the number of the last packet sent, an access point MAC address, and GPS coordinates (if available). Eventually, client 204a decides to leave the system and a request to leave is sent to the host 202 at line 222. The host 202 then removes client 204a from the communication session at line 224. Clients 204b and 204c are then updated, at lines 226, that client 204a has left the session. In this way, a communication session is carried out over the system.

In one exemplary implementation, the system transfers data packets using User Datagram Protocol (UDP) within the Transport layer of the OSI network model. UDP has been found to be effective as there is no acknowledgement system built into the protocol. This allows data packets to be sent as fast as network conditions will allow without the requirement of retransmission of a packet which could delay other packets in a queue. Further, the 802.11 WiFi protocols and standards used by the system have their own acknowledgement system. However, the 802.11 protocols and standards specify the Data link layer and Physical layer of the OSI network model, and have no knowledge of what transport protocol is being used. This lower layer acknowledgment can still allow for retransmission of packets, which can result in negative effects on real-time audio applications. This acknowledgment can be bypassed by using broadcast or multicast transmission types in lieu of the more common unicast, or point to point, type. Multicast is a routing scheme that allows for data transmission to be sent to a group of destination networked devices. This is done by sending data to a specific IP address that one or more devices can subscribe, or listen to. Multicast can be implemented as early as the data link layer of the OSI network model. With this scheme, the source entity outputs data to one IP address and any number of entities on the system can subscribe to that IP address to receive the data. Accordingly, using UDP and multicast allows for data packets to be sent and received at the highest throughput allowable.

However, several challenges arise when using multicast. With no acknowledgement system in place, data packets have a high chance of being lost in transit. When using multicast over WiFi, lower data transmission rates and higher power can be used to send packets slower and farther, to maximize the chance of successful packet delivery to the destination entity. But this isn't always an optimal solution, particularly when a recipient is close to an access point. Even within regulated limits, higher transmission powers can lead to interference, even for the access point's own transmit and receive data streams. Further, multicast packets arriving quickly and without acknowledgement can prevent the communication device from going into power saving mode to conserve power. If a client is battery powered, this can lead to fast battery drain as compared to unicast WiFi systems. As will be described in more detail below, the system uses a combination of multicast and unicast to transmit data packets to maximize throughput while minimizing significant data loss.

Figure 3:
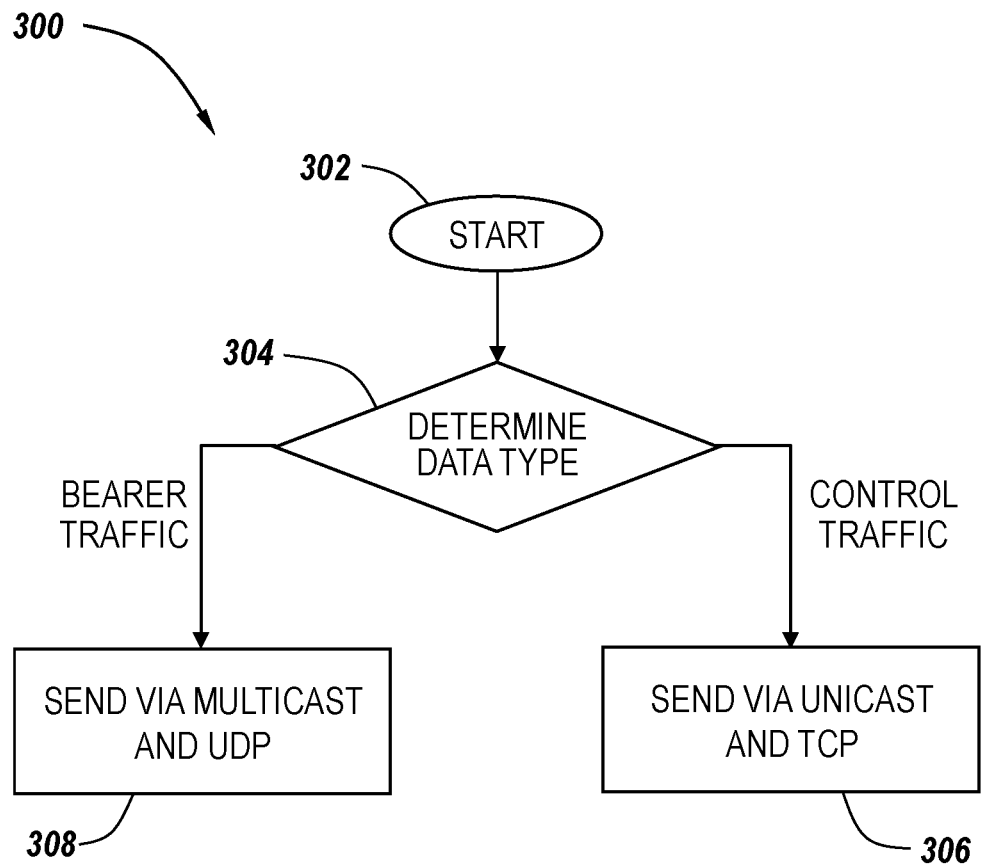
FIG. 3 is an exemplary flowchart of how the system can transmit data based on data type.

Referring now to FIG. 3, an exemplary flowchart 300 of how the system can transmit data based on data type is shown. The flowchart 300 starts, at step 302, when data is transmitted between a host and a client. At step 304, the system determines the data type for the transmitted data. The two main data types will be referred to as bearer traffic and control traffic. The bearer traffic relates generally to the media content being transferred over the system, such as data packets related to audio and video communication between the devices. The bearer traffic includes both the multimedia transmission itself and codec specifications and upper layer protocols that detail streaming media contained in the data packets. The control traffic (e.g. status packets periodically transmitted during a communication session), generally contains more important information such as details about the session. This can include information about the system status, client status, and other items related to quality of service which the system can rely on to make changes to the session.

If, at step 304, the system determines that the data packets relate to control traffic, the packets are transmitted using unicast and TCP at step 306. While it is more critical to ensure delivery of the control traffic, this data can also tolerate some delay. Therefore control data will be sent using the unicast and TCP transmission schemes to allow for improved chances of the data reaching its destination.

If the system determines, at step 304, that the data packet relates to bearer traffic, the packets are typically transmitted using multicast and UDP at step 308. For bearer traffic, a certain amount packet loss is acceptable, as long as overall communication is intelligible. Therefore, multicast is usually used when the data packet is found to relate to bearer traffic. Other adjustments are made within the multicast distribution scheme to optimize performance. The logic shown in flowchart 300 can be repeated for each data packet transmitted over the system.

Figure 4:
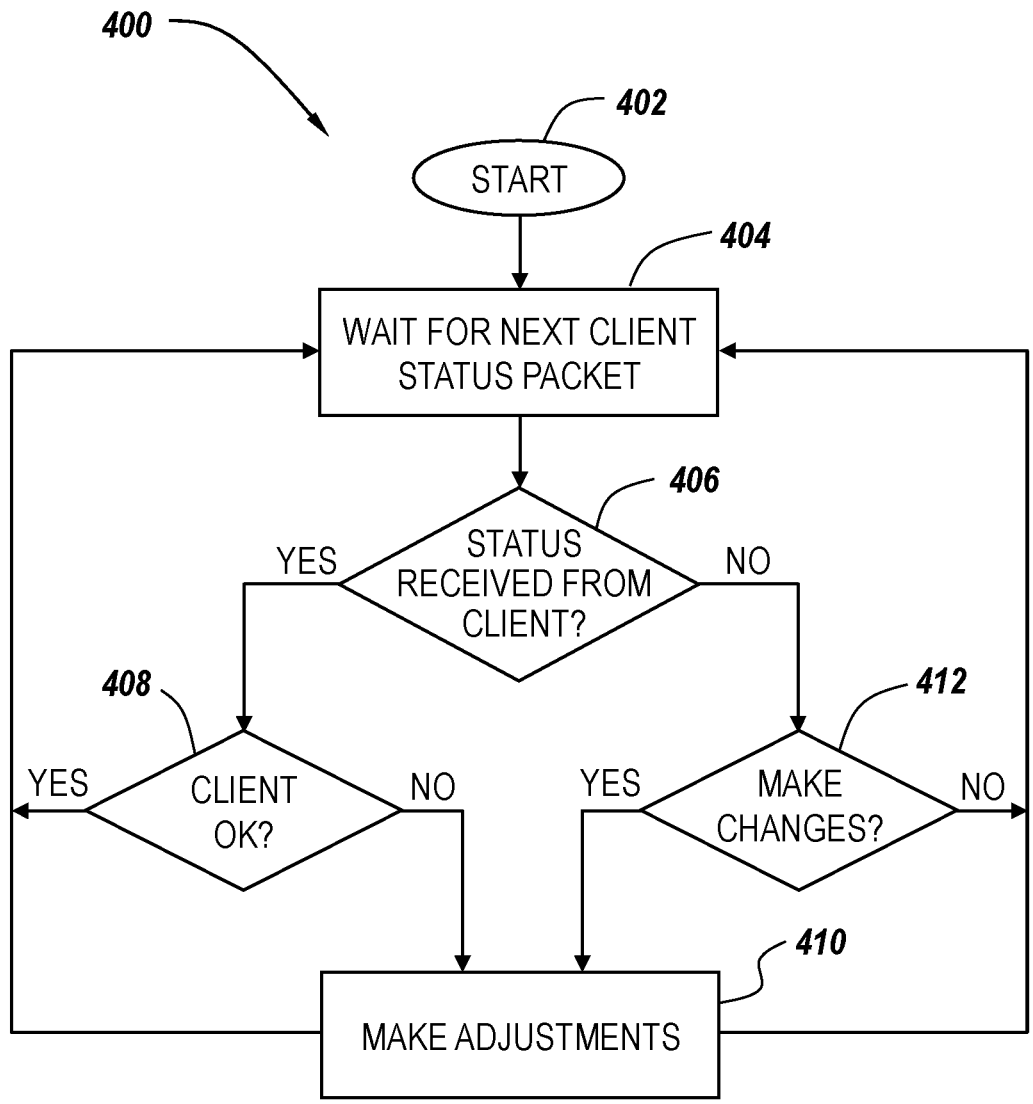
FIG. 4 is an exemplary logical flowchart showing how the system can make changes during a communication session to optimize performance.

Referring now to FIG. 4, a flowchart 400 of exemplary logic of how the system can make changes during a communication session to optimize performance is shown. As noted above, numerous performance metrics of the system can be tracked during a given communication session. This can be accomplished, for example, by determining the performance of individual communication devices based on the information in the control packets transmitted by those devices (or, alternatively, by the lack of receipt of a control packet from a device). Therefore after the communication starts at 402, the system waits for the next client status packet from each communication device in communication on the system at step 404. Status packets are expected to be received on a known schedule, such as in regular intervals of a set time frame.

At step 406, the system considers whether the packet has been received as expected. If the system receives the status packet as expected, the system then analyzes the control traffic information therein at step 408. If the communication device is experiencing an acceptable level of performance, no changes need to be made to the system and the system returns back to step 404 to wait for the next client status packet. Alternatively, if at step 408 the control traffic shows that the client in question is experiencing inadequate performance, changes can be made at step 410, as will be discussed in more detail. In general, changes to performance parameters such as modulation rates, codec, and forward error correction, and other performance parameters, are changed based off performance metrics such as RSSI, bit error rate, jitter, and other performance parameters. In particular, latency, jitter, packet loss, and received signal strength indicator (RSSI) are all performance metrics which tend to have a large impact on quality of service. Therefore the system can measure those performance metrics and make changes to the data packet distribution scheme based on those performance metrics. Changes can also be made to system (architecture) parameters, such as transitioning between unicast and multicast and mixing on the client or server based on system metrics such as number of users and system loading. Additionally, system metrics such as number of users and the overall loading of the system may be used to facilitate broader architecture changes, as described later. Various metrics which the system can rely upon to change parameters are now discussed in more detail.

Latency is the time it takes for a packet to get from one point to another, and is typically estimated in the context of the system. Typically, one-way latencies above 100 milliseconds are problematic as this can lead to users talking over each other or long pauses as a user's natural cadence for conversation is affected by said latency.

Jitter is a term given to the variation of latency. In an ideal situation, latency is static and therefore jitter is 0 milliseconds. However when large changes in latency occur, jitter is used as an additional metric to gauge system performance. Keeping jitter below 100 milliseconds allows for some small changes in latency to occur. Beyond this, transmission delays can occur as buffers start to fill and eventually packet loss can occur due to buffers filling to capacity and buffer time-outs or packet time to live limits expire.

Packet loss is the most apparent to users when evaluating system performance and a common end-result of the aforementioned metrics. In this case, packet loss refers to the bearer traffic, so a lost packet results in a failure to deliver transmitted multimedia data to a destination entity. This comes through, for the destination entity, as silence. If packets are dropped when a user is talking, it can result in unintelligible speech.

RSSI is calculation that determined the strength of the signal between a host and client. This is typically a broad measurement to indicate what performance should be expected.

Predetermined thresholds can be set for each performance metric. When the threshold is crossed, changes are made to the system. The system's approach of transmitting bearer traffic using multicast and UDP is likely to lead to high packet loss in weak signal areas. For this reason, the system implements dynamic optimization techniques to improve the probability of a packet being received by the intended destination depending on the performance metrics. More particularly, the host, through one or more access points, distributes data packets (and particularly, data packets related to bearer traffic) according to a multicast distribution scheme. The multicast distribution scheme can be altered in real time to deliver the best system performance by different methods, including WiFi modulation, forward error correction, and audio codec sample and bit rates, as discussed in more detail below.

In some cases, the system does not receive an expected status packet at all at step 406. The system then determines, at step 412, whether the lack of a status packet warrants action. If the time interval between the expected receipt times of status packets is relatively short, and previous status packets have been received as expected, the failure to deliver one expected status packet from client to host may not be of a concern. In that case, the system can elect to forgo making any adjustments, for the time being, and return to step 404 to wait for the next expected status packet. Once the failure to deliver a status packet is deemed unacceptable, adjustments are made at step 410.

At step 410, the system makes changes by adjusting the distribution scheme utilized to facilitate communication over the system between the devices. To that end, the WiFi modulation can be dynamically altered between WiFi standards to achieve the standard that best suits the system's needs at a given time. For instance, WiFi modulation can include changing a frequency of operation and transmission rates to transport the data packets to communication devices which are a further distance from the access point. In some cases, the host can take action based on a client's reported RSSI when the received data reaches a certain threshold. The host can then communicate with the access point that is providing the wireless link to the client in question to change the modulation rate or broadcast frequency in an effort to improve said client's RSSI. This can be accomplished through custom firmware running on the given access point. If the RSSI does not improve after the changes are in effect, the server may decide to disconnect the client from the call session. Further, at a certain RSSI, the access point may terminate the wireless link to that client entirely.

The multicast rate may also be adjusted to improve packet delivery to all devices in the system. For example, if the RSSI for a given device (or devices) decreases to a predetermined lower threshold such that multicast packets are being received with a large number of errors, then the access point will decrease the multicast rate. Similarly, the multicast rate will be increased when the devices in the multicast group report improvement in RSSI above a predetermined upper threshold. Further, in order to keep delays manageable (or for delays negatively impacting overall system throughput), a minimum multicast rate below which the multicast rate is not decreased can be established.

In certain cases, set parameters can be established to optimize system performance. For example, a smallest allowable beacon interval can be employed. Setting the smallest allowable beacon interval at 100 milliseconds has been found to be effective. Further, a default DTIM interval of 1 can be used. This means that the multicast frames, if available, will be transmitted by the access point following each beacon. The number of multicast frames transmitted will be limited by a configurable parameter. Further, depending on the performance criterion desired, any remaining multicast frames will be discarded by the access point since they will arrive at the destination with excessive delay.

In order to optimize power consumption at the devices, the access point may also implement a dynamic DTIM interval. The access point can first identify whether real-time multimedia sessions are in progress. If there are no real-time multimedia sessions in progress, the DTIM interval can be increased. Further, the DTIM interval can be increased depending on delay and jitter in accordance with desired performance, and the dynamic multicast distribution scheme can be changed accordingly.

The dynamic multicast distribution scheme can also include a multicast rate which changes according to communication metrics. The multicast rate may be altered depending on the number of devices attached and the total traffic (including uplink and downlink). For example, when the traffic exceeds a given threshold, the multicast rate is increased and devices at the edge of the WiFi network will be disconnected (explicitly or implicitly).

In another instantiation, the maximum percentage of non-unicast traffic permitted per beacon period may be limited to ensure that sufficient capacity is set aside so that packets from all of the devices can be transmitted successfully. In general, multicast traffic interrupts unicast traffic, taking priority so that multicast traffic can start on schedule. There is a risk that multicast traffic can then consume too much capacity and prevent any unicast traffic. Therefore, the system can monitor multimedia traffic transmitted by clients within a communication session and set a maximum percentage of non-unicast traffic permitted per beacon period. As the number of clients in the session that are transmitting multimedia traffic to others increases, additional capacity will be set aside for unicast traffic. To accomplish this, the distribution scheme changes such that the percentage of non-unicast traffic permitted per beacon period is decreased as the clients transmitting multimedia traffic increases.

At step 410, forward error correction can also be implemented to change the multicast distribution scheme. Several methods of error correction can be swapped between based on system conditions. Methods of forward error correction can include controlled repeating of packets and sending of a packet that contains the previous, current, and next packet in a payload. The receiving system would then be able to reconstruct missing or corrupted data by utilizing the redundant information. Both schemes are bandwidth sensitive to a degree, as sending the same packet multiple times or sending larger packets will increase bandwidth usage. The packet loss status that is shared from client to server will heavily influence the amount of forward error correction that is in place. For instance, if there is no packet loss, there will be no need for error correction. If packet loss were to increase, the server may initiate a forward error correction such as repeat packets to that client, and look for improvement in that packet loss performance metric. If that metric remains the same or worsens, more aggressive forward error correction may take place, such as sending the packet multiple times. Forward error correction may also lessen and stop as metrics improve to minimize any bandwidth impacts the forward error correction may be introducing.

An additional way to change the distribution scheme to the client, at step 410, is to change the codec. Several standard audio codecs can be utilized and offer different sample rates and bit rates with minimal audio quality differences. Lower bandwidth codecs could be used when implementing forward error correction to minimize bandwidth increase of multiple or larger packets. Additionally, a lower bitrate codec could be paired with a lower bandwidth WiFi modulation standard. A custom codec may also be implemented for additional optimization opportunities. In some cases, the multicast distribution scheme changes according to at least one communication metric through WiFi modulation and changing audio codec sampling and bit rates. This can include changing audio codec sampling and bit rates by transporting data packets using a lower bitrate codec while a lower bandwidth WiFi modulation standard is implemented. In these ways, the dynamic distribution scheme can be changed to optimize performance for clients on the system at step 410. The flowchart then returns to step 404 to wait for the next status packet to continually optimize system performance.

Distributing the packets over the system using a multicast distribution scheme provides overall system performance that is mostly independent of the number of users and system loading, as compared to a unicast system. However, the end to end delays of a multicast system can be slightly larger (even though they meet the overall performance requirements) than a comparable unicast system under light loading conditions and when the devices are all in good coverage areas. Therefore to ensure optimal performance, the system can also make adjustments at step 410 through a host application and/or access point by transitioning between unicast and multicast operating modes depending on the overall system load and monitoring of the end-to-end delays. For example, when the total data packets transmitted over the system during a given time period is over a set number, the dynamic multicast distribution scheme can be used, while when the total data packets transmitted over the time period is less than the set number, a unicast distribution scheme can be used.

In addition to the distribution scheme of the system architecture being modified, the location of the multimedia mixing could switch from the communication devices to the server at step 410. As the number of users increase, the ability for a communication device to mix all incoming multimedia packets could be negatively impacted due to the limitations of the communication device's hardware and software. Therefore, at some predetermined threshold, the server may take on the responsibility of mixing multimedia data in order to provide the best user experience.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. servers, communication devices, etc.) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed. Additionally, the subject technology includes methods of carrying out the functions of the system as described herein.

What is claimed is:

1. A wireless communication system comprising:
   a host application running on a server;
   a plurality of communication devices configured to act as destination entities and receive a plurality of data packets containing digital information related to at least one type of media content, at least one of the communication devices further configured to act as a source entity and send the data packets; and
   an access point in communication with the host application and in wireless communication with the communication devices, the access point configured to receive the data packets from the at least one communication device configured to act as the source entity and distribute the data packets to the communication devices according to a dynamic multicast distribution scheme,
   wherein:
   the dynamic multicast distribution scheme changes according to at least one communication metric through at least one of the following: WiFi modulation; forward error correction; and audio codec sampling and bit rates;
   at least one of the communication devices is configured to periodically send client status data packets to the host application at a set time interval; and
   the host application is configured to take action based on: whether an expected client status data packet is received; and information contained in the client status data packets.

2. The wireless communication system of claim 1, wherein the communication metrics include jitter, an estimate of latency, packet loss, and received signal strength indicator (RSSI).

3. The wireless communication system of claim 1, wherein the communication metrics include an estimate of latency and the dynamic multicast distribution scheme changes when the estimate of latency exceeds a predetermined threshold.

4. The wireless communication system of claim 1, wherein the communication metrics include jitter and the dynamic multicast distribution scheme changes when jitter exceeds a predetermined threshold.

5. The wireless communication system of claim 1, wherein the communication metrics include received signal strength indicator (RSSI), and the wireless communication system is further configured such that when RSSI for one of the communication devices exceeds a predetermined threshold, the dynamic multicast distribution scheme changes, for said communication device, to utilize a new WiFi standard.

6. The wireless communication system of claim 1, wherein the communication metrics include received signal strength indicator (RSSI), and the wireless communication system is further configured such that when RSSI for one of the communication devices exceeds a predetermined threshold, the dynamic multicast distribution scheme changes, for said communication device, to utilize one of the following: a new modulation rate; or a new broadcast frequency.

7. The wireless communication system of claim 2, wherein:

the communication metrics further include bit error rate; and the dynamic multicast distribution scheme changes when bit error rate exceeds a predetermined threshold.

8. The wireless communication system of claim 1, wherein the dynamic multicast distribution scheme changes according to at least one communication metric through WiFi modulation, WiFi modulation comprising: changing frequency of operation and transmission rates to transport the data packets to communication devices which are a further distance from the access point.

9. The wireless communication system of claim 1, wherein the dynamic multicast distribution scheme changes according to at least one communication metric through forward error correction, forward error correction comprising one or more of the following: sending at least one data packet multiple times; and sending at least one data packet containing a previous, current, and next data packet in a payload.

10. The wireless communication system of claim 1, wherein the dynamic multicast distribution scheme changes according to at least one communication metric through WiFi modulation and changing audio codec sampling and bit rates, changing audio codec sampling and bit rates including transporting the data packets using a lower bitrate codec while a lower bandwidth WiFi modulation standard is implemented.

11. The wireless communication system of claim 1, wherein the system is configured to allow the communication devices to dynamically connect to the host application via the access point such that the communications devices can connect to, or disconnect from, the host application during a communication session.

12. The wireless communication system of claim 1, wherein the host application is configured to:
allow a plurality of communication devices to dynamically connect to, or disconnect from, the host application via the access point during a communication session;
selectively disconnect communication devices from a communication session based on the communication metrics; and
control the transfer of the data packets between the access point and the communication devices.

13. The wireless communication system of claim 1, wherein the data packets are transported using User Datagram Protocol.

14. The wireless communication system of claim 1, wherein the host application is configured to:
identify data packets as bearer traffic or control traffic, the bearer traffic related to media content and the control traffic related to at least one of the following: system status; and client status;
transport the bearer traffic using multicast and User Datagram Protocol; and
transport the control traffic using unicast and Transmission Control Protocol.

15. The wireless communication system of claim 1, wherein:
the access point is a first access point;
the server is also in communication with a second access point;
the plurality of communications devices include a first plurality of communication devices and a second plurality of communication devices;
the first plurality of communication devices are configured to dynamically connect to the host application via wireless communication with the first access point such that the first plurality of communications devices can connect to, or disconnect from, the host application during a communication session;
the second plurality of communication devices are configured to dynamically connect to the host application via wireless communication with the second access point such that the second plurality of communications devices can connect to, or disconnect from, the host application during the communication session; and
the host application receives data packets containing digital information related to at least one type of media content from at least one of the first or second plurality of communication devices, the data packets being distributed to the others of the communication devices according to the dynamic multicast distribution scheme.

16. The wireless communication system of claim 1, wherein:
the wireless communication system is configured to switch the distribution scheme between a unicast distribution scheme and a multicast distribution scheme based on system performance metrics, the system performance metrics including a number of communication devices in a communication session and a system load;
the multicast distribution scheme includes performance parameters including modulation rates, audio codec sampling and bit rates, and forward error correction, the performance parameters being changed according to performance metrics including received signal strength indicator, bit error rate, and jitter; and
the wireless communication system is configured to set a location for multimedia mixing on either the server or the communication devices based on the system performance metrics.

17. A wireless communication system comprising:
a host application running on a server;
a plurality of communication devices configured to act as destination entities and receive a plurality of data packets containing digital information related to at least one type of media content, at least one of the communication devices further configured to act as a source entity and send the data packets; and
an access point in communication with the host application and in wireless communication with the communication devices, the access point configured to receive the data packets from the at least one communication device configured to act as the source entity and distribute the data packets to the communication devices according to a dynamic multicast distribution scheme,
wherein the dynamic multicast distribution scheme changes according to at least one communication metric through forward error correction and changing audio codec sampling and bit rates, changing audio codec sampling and bit rates including transporting the data packets using a lower bandwidth codec while forward error correction is implemented.

18. A wireless communication system comprising:
a host application running on a server;
a plurality of communication devices configured to act as destination entities and receive a plurality of data packets containing digital information related to at least one type of media content, at least one of the communication devices further configured to act as a source entity and send the data packets; and an access point in communication with the host application and in wireless communication with the communication devices, the access point configured to receive the data packets from the at least one communication device configured to act as the source entity and distribute the data packets to the communication devices according to a dynamic multicast distribution scheme, wherein:

the dynamic multicast distribution scheme changes according to at least one communication metric through at least one of the following: WiFi modulation; forward error correction; and audio codec sampling and bit rates; and the communication metrics include received signal strength indicator (RSSI), and the dynamic multicast distribution scheme changes based on RSSI such that:

when RSSI device for a communication device decreases below a predetermined lower threshold, the access point decreases a multicast rate to said device, the multicast rate to said device increasing when RSSI exceeds a predetermined upper threshold; and when RSSI for a communication device decreases below a minimum threshold, the access point changes the multicast rate for said device to a minimum rate.

19. A wireless communication system comprising:

a host application running on a server;

a plurality of communication devices configured to act as destination entities and receive a plurality of data packets containing digital information related to at least one type of media content, at least one of the communication devices further configured to act as a source entity and send the data packets; and an access point in communication with the host application and in wireless communication with the communication devices, the access point configured to receive the data packets from the at least one communication device configured to act as the source entity and distribute the data packets to the communication devices according to a dynamic multicast distribution scheme, wherein:

the dynamic multicast distribution scheme changes according to at least one communication metric through at least one of the following: WiFi modulation; forward error correction; and audio codec sampling and bit rates;

the dynamic multicast distribution scheme includes a minimum allowable WiFi beacon interval of 100 milliseconds and a DTIM interval of 1; and the wireless communication system discards multicast frames when a delay for said frames exceeds a threshold.

20. A wireless communication system comprising:

a host application running on a server;

a plurality of communication devices configured to act as destination entities and receive a plurality of data packets containing digital information related to at least one type of media content, at least one of the communication devices further configured to act as a source entity and send the data packets; and an access point in communication with the host application and in wireless communication with the communication devices, the access point configured to receive the data packets from the at least one communication device configured to act as the source entity and distribute the data packets to the communication devices according to a dynamic multicast distribution scheme, wherein:

the dynamic multicast distribution scheme changes according to at least one communication metric through at least one of the following: WiFi modulation; forward error correction; and audio codec sampling and bit rates;

the access point is further configured to identify whether real-time multimedia sessions are in progress and increase a DTIM interval when no real-time multimedia sessions are in progress; and the communication metrics include jitter and delay, and the dynamic multicast distribution scheme changes the DTIM interval based on the jitter and delay.

21. A wireless communication system comprising:

a host application running on a server;

a plurality of communication devices configured to act as destination entities and receive a plurality of data packets containing digital information related to at least one type of media content, at least one of the communication devices further configured to act as a source entity and send the data packets; and an access point in communication with the host application and in wireless communication with the communication devices, the access point configured to receive the data packets from the at least one communication device configured to act as the source entity and distribute the data packets to the communication devices according to a dynamic multicast distribution scheme, wherein:

the dynamic multicast distribution scheme changes according to at least one communication metric through at least one of the following: WiFi modulation; forward error correction; and audio codec sampling and bit rates;

the access point is further configured to selectively change between the dynamic multicast distribution scheme and a unicast distribution scheme; and the unicast distribution scheme is used when a total of data packets transmitted over the wireless communication system over a set time period is below a set total and the dynamic multicast distribution scheme is used when the total of the data packets transmitted over the wireless communication over the set time period is above the set total.

22. The wireless communication system of claim 21, wherein:

the at least one communication metric includes delay; and the access point selectively changes between the dynamic multicast distribution scheme and the unicast distribution scheme according to the delay.

23. A wireless communication system comprising:

a host application running on a server;

a plurality of communication devices configured to act as destination entities and receive a plurality of data packets containing digital information related to at least one type of media content, at least one of the communication devices further configured to act as a source entity and send the data packets; and an access point in communication with the host application and in wireless communication with the communication devices, the access point configured to receive the data packets from the at least one communication device configured to act as the source entity and distribute the data packets to the communication devices according to a dynamic multicast distribution scheme, wherein:

the dynamic multicast distribution scheme changes according to at least one communication metric through at least one of the following: WiFi modulation; forward error correction; and audio codec sampling and bit rates;

the dynamic multicast distribution scheme includes a WiFi beacon interval; and the dynamic multicast distribution scheme includes a maximum percentage of non-unicast traffic permitted per WiFi beacon interval, the maximum percentage of non-unicast traffic permitted per WiFi beacon interval decreasing as a total traffic of the wireless communication system increases.

24. The wireless communication system of claim 23, wherein the dynamic multicast distribution scheme changes based on a total number of communication devices transmitting data packets over the system and a total traffic of the system.

25. The wireless communication system of claim 24, wherein, when the total traffic of the system exceeds a given threshold, a multicast rate of the dynamic multicast distribution scheme increases and communication devices with a received signal strength indicator below a set threshold are disconnected.

26. A wireless communication system comprising:

a host application running on a server;

a plurality of communication devices configured to act as destination entities and receive a plurality of data packets containing digital information related to at least one type of media content, at least one of the communication devices further configured to act as a source entity and send the data packets; and an access point in communication with the host application and in wireless communication with the communication devices, the access point configured to receive the data packets from the at least one communication device configured to act as the source entity and distribute the data packets to the communication devices according to a dynamic multicast distribution scheme, wherein:

the dynamic multicast distribution scheme changes according to at least one communication metric through at least one of the following: WiFi modulation; forward error correction; and audio codec sampling and bit rates; and the wireless communication system is further configured to set a location for multimedia mixing based on a total number of communication devices in a communication session, wherein:

when the total number is below a predetermined threshold, multimedia mixing is carried out at each communication device; and when the total number is above the predetermined threshold, multimedia mixing is carried out on the server.

* * * * *